(12) United States Patent
Lynn

(10) Patent No.: US 12,229,575 B2
(45) Date of Patent: Feb. 18, 2025

(54) HOPPING MECHANISM FOR CONTAINER SECURITY

(71) Applicant: Cisco Technology, Inc., San Jose, CA (US)

(72) Inventor: Alan Robert Lynn, Burke, VA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 724 days.

(21) Appl. No.: 17/166,145

(22) Filed: Feb. 3, 2021

(65) Prior Publication Data

US 2022/0244977 A1     Aug. 4, 2022

(51) Int. Cl.
    *G06F 9/455*       (2018.01)

(52) U.S. Cl.
    CPC ............ *G06F 9/45558* (2013.01); *G06F 2009/45562* (2013.01); *G06F 2009/45587* (2013.01)

(58) Field of Classification Search
    None
    See application file for complete search history.

(56) References Cited

U.S. PATENT DOCUMENTS

| | | | |
|---|---|---|---|
| 2,292,387 | A | 8/1942 | Markey et al. |
| 9,794,275 | B1 | 10/2017 | Benameur et al. |
| 11,520,919 | B2* | 12/2022 | Piccinini ............. G06F 9/45558 |
| 2011/0276597 | A1 | 11/2011 | Little |
| 2018/0159701 | A1* | 6/2018 | Krause ................ H04L 61/2514 |
| 2018/0159745 | A1* | 6/2018 | Byers ................... H04L 41/122 |
| 2018/0332073 | A1 | 11/2018 | Ahmed |
| 2019/0018973 | A1 | 1/2019 | Talley et al. |

OTHER PUBLICATIONS

International Search Report and Written Opinion corresponding to PCT Application No. PCT/US2022/013100, dated Apr. 21, 2022, 14 pages.
Boris Dragovic Jon Crowcroft, "Information Exposure Control through Data Manipulation for Ubiquitous Computing", ACM, 2 Penn Plaza, Suite 701, New York, NY USA, https://doi.org/10.1145/1065907.1066036 Abstract, sections 1, 3.2, 6, Sep. 20, 2004, pp. 57-64.

(Continued)

*Primary Examiner* — Lewis A Bullock, Jr.
*Assistant Examiner* — Melissa A Headly
(74) *Attorney, Agent, or Firm* — Baker Botts L.L.P.

(57) ABSTRACT

The present disclosure is directed to systems and methods for container security using a hopping mechanism. Methods include the steps of selecting a first virtual container associated with one or more software processes; replicating the first virtual container to create a plurality of replicated virtual containers, each of the plurality of replicated virtual containers a duplicate of the first virtual container, and the plurality of replicated virtual containers configured to run synchronously; generating a randomized hopping set that defines a set of replicated virtual containers from the plurality of replicated virtual containers, the randomized hopping set establishing a sequence of the set of replicated virtual containers in which to run the one or more software processes; and running the one or more software processes across the set of replicated virtual containers based on the sequence of the randomized hopping set.

12 Claims, 4 Drawing Sheets

(56) References Cited

OTHER PUBLICATIONS

Thad Benjaponpitak et al., "Enabling Live Migration of Containerized Applications Across Clouds," *IEEE Xplore* (pp. 2529-2538), Downloaded Aug. 8, 2020.
David S. Linthicum, "Practical Use of Microservices in Moving Workloads to the Cloud," http://mycs.computer.org; *Cloud Tidbits Column, IEEE Computer Society*, © 2016 (pp. 6-9).

* cited by examiner ns-5575 B2

HOPPING MECHANISM FOR CONTAINER SECURITY

TECHNICAL FIELD

The present disclosure generally relates to virtualized containers, and more specifically to a hopping mechanism for container security.

BACKGROUND

Virtualization is a process wherein software is used to create an abstraction layer over computer hardware that allows the hardware elements of a single computer to be divided into multiple virtual computers. A container is an executable virtual package of software that virtualizes the operating system (OS) on which it sits, sharing the host OS kernel and its resources with both the host and other containers.

DESCRIPTION OF EXAMPLE EMBODIMENTS

Overview

Figure 1:
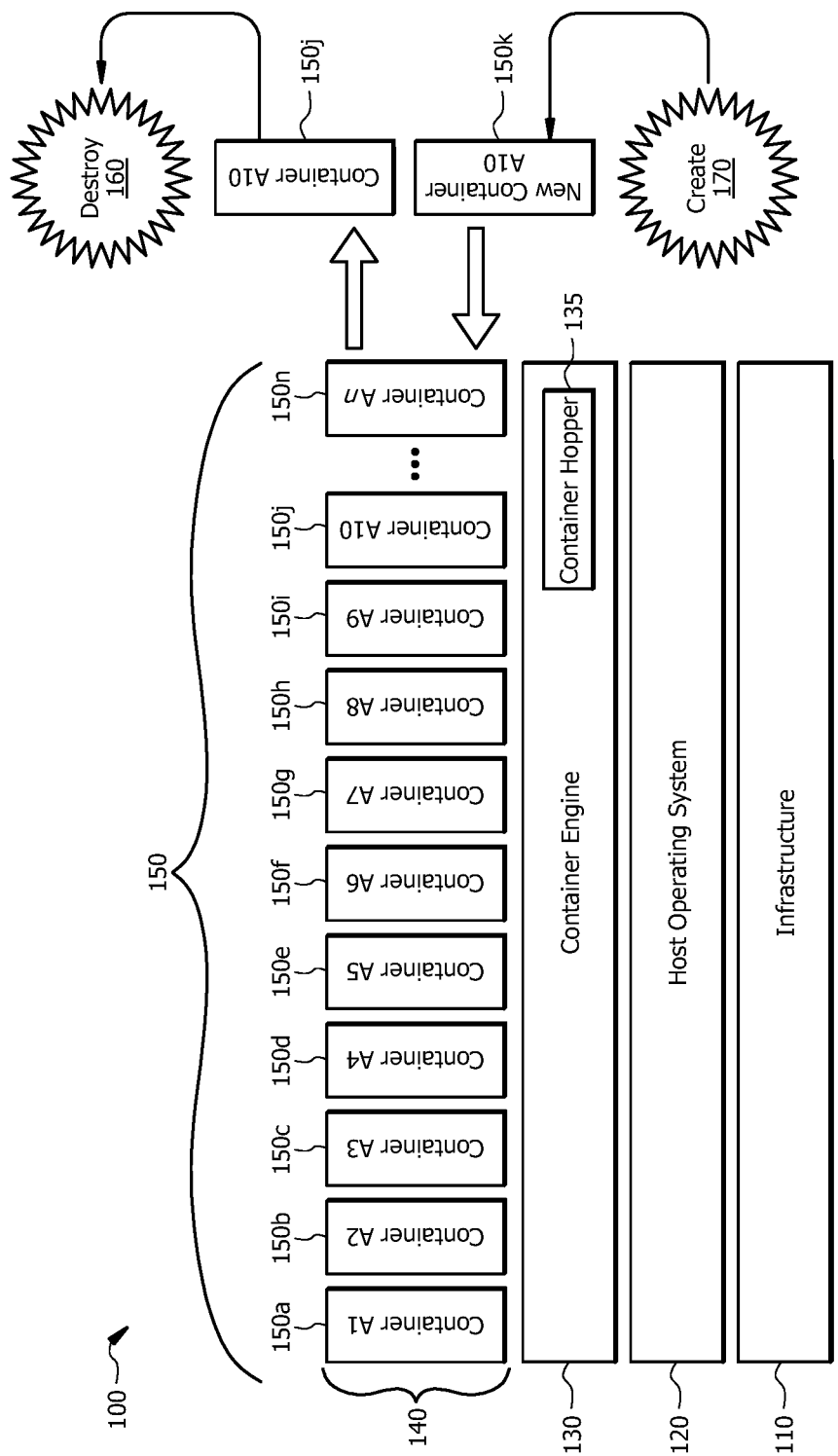
FIG. 1 illustrates a system for container security using a hopping mechanism, in accordance with certain embodiments.

According to an embodiment, a system may include one or more processors and one or more computer-readable non-transitory storage media comprising instructions that, when executed by the one or more processors, cause one or more components of the system to perform operations including, selecting a first virtual container associated with one or more software processes; replicating the first virtual container to create a plurality of replicated virtual containers, each of the plurality of replicated virtual containers a duplicate of the first virtual container, and the plurality of replicated virtual containers configured to run synchronously; generating a randomized hopping set that defines a set of replicated virtual containers from the plurality of replicated virtual containers, the randomized hopping set establishing a sequence of the set of replicated virtual containers in which to run the one or more software processes; and running the one or more software processes across the set of replicated virtual containers based on the sequence of the randomized hopping set.

Moreover, the randomized hopping set may be associated with a time setting, the time setting indicating one or more lengths of time the one or more software processes will run from each replicated virtual container of the set of replicated virtual containers. The randomized hopping set may further be associated with a port setting, the port setting indicating one or more ports from which each replicated virtual container of the set of replicated virtual containers will run the one or more software processes.

Additionally, the operations may further include updating the plurality of replicated virtual containers, wherein the updating comprises deleting one or more replicated virtual containers of the plurality of replicated virtual containers. The operations may further include updating the plurality of replicated virtual containers, wherein the updating comprises creating one or more new replicated virtual containers.

Moreover, the operations may further include updating the randomized hopping set with an updated set of replicated virtual containers from the plurality of replicated virtual containers, the updated randomized hopping set establishing an updated sequence for running the one or more software processes.

Additionally, the plurality of replicated virtual containers may be configured to support a plurality of tenants, wherein a respective randomized hopping set is generated for each tenant of the plurality of tenants.

According to another embodiment, a method may include the steps of selecting a first virtual container associated with one or more software processes; replicating the first virtual container to create a plurality of replicated virtual containers, each of the plurality of replicated virtual containers a duplicate of the first virtual container, and the plurality of replicated virtual containers configured to run synchronously; generating a randomized hopping set that defines a set of replicated virtual containers from the plurality of replicated virtual containers, the randomized hopping set establishing a sequence of the set of replicated virtual containers in which to run the one or more software processes; and running the one or more software processes across the set of replicated virtual containers based on the sequence of the randomized hopping set.

According to yet another embodiment, one or more computer-readable non-transitory storage media may embody instructions that, when executed by a processor, cause the performance of operations including, selecting a first virtual container associated with one or more software processes; replicating the first virtual container to create a plurality of replicated virtual containers, each of the plurality of replicated virtual containers a duplicate of the first virtual container, and the plurality of replicated virtual containers configured to run synchronously; generating a randomized hopping set that defines a set of replicated virtual containers from the plurality of replicated virtual containers, the randomized hopping set establishing a sequence of the set of replicated virtual containers in which to run the one or more software processes; and running the one or more software processes across the set of replicated virtual containers based on the sequence of the randomized hopping set.

Technical advantages of certain embodiments of this disclosure may include one or more of the following. The systems and methods described herein may allow for container security in a virtualized environment via a hopping mechanism (also referred to in the present disclosure as "container hopping"). Specifically, in accordance with the present disclosure, a given container associated with a software process or a workload may be replicated to create a plurality of replicated virtual containers. The software process or workload may then be moved across the plurality of replicated virtual containers in accordance with a sequence, as well as a time and/or port setting, established by a hopping set. Thus, the software process (and the information associated therein) may be moved (i.e., may "hop") from container to container in a pseudo-random manner, the software process remaining with a given replicated container for a predetermined period of time before hopping to the next container. The sequence and settings of the hopping set are only known to the user of the container and the administrator of the system. The result is a trusted and secure environment that would be very difficult for an unauthorized user to hack. Additionally, the mechanism may be applied in various cloud security contexts, may be combined with various technologies, and may provide performance improvements over existing securities, such as virtual private networks (VPNs).

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

Virtualization is the process of running a virtual instance of a computer system in a layer abstracted from the computer hardware. Virtualization uses software to create an abstraction layer over computer hardware that allows the hardware elements of a single computer—processors, memory, storage and more—to be divided into multiple virtual computers.

Containers provide a light-weight and agile means of handling virtualization. A container packages together everything needed to run a small piece of software. Using a form of operating system (OS) virtualization, containers sit on top of a physical layer and its host OS and shares the host OS kernel, as well as the binaries and libraries. As a result, containerization allows for numerous containers, e.g., containerized applications, to be placed on a single server, while providing a portable and consistent operating environment for development, testing, and deployment.

As technology continues to move toward a virtual, cloud-based environment, containerized systems are increasingly in demand. The present disclosure is directed to systems and methods for securing containers using a container hopping mechanism. Specifically, the present disclosure is directed to replicating a virtual container to create a plurality of replicated synchronously-running virtual containers, and then running the software process or workload associated with the virtual container from one or more of the plurality of replicated containers in a pseudo-random manner in accordance with a sequence set forth in a hopping set. The software process or workload stays with a given replicated virtual container for only a brief (pre-determined) period of time before hopping to the next replicated virtual container in the sequence. As such, the ability of an unauthorized user to access and/or maintain hold of a container and its associated software process is severely limited.

FIG. 1 depicts a system 100 for container security using a hopping mechanism. FIG. 1 generally shows the architecture of a containerized system in accordance with the present disclosure. Specifically, the architecture of the system 100 is represented by a series of layers. The base layer comprises the infrastructure 110, or the physical hardware used for deployment. The infrastructure 110 may include the one or more processors (including a multicore processor), one or more controllers, one or more memory modules, one or more system buses, and the like. Sitting atop the infrastructure 110 is a host operating system (OS) 120. By way of example, the host OS may comprise a Linux® or Windows® OS. Each container may share the host OS kernel and may leverage features of the OS to isolate processes and control their access to CPUs, memory, and disk space.

The next layer is a virtualization layer that comprises the container engine 130. The container engine 130 is a managed environment for deploying containers and may include functionality for allocating cores and memory to containers, enforcing spatial isolation and security, and providing load balancing and scalability by enabling the addition and removal of containers. Thus, a single container engine 130 may manage large numbers of containers and create additional containers, as needed. In accordance with the present disclosure, the container engine 130 may also include a container hopper 135 that comprises a software module or set of software modules for performing and/or carrying out the functionality of the present disclosure, as described below. In an embodiment, the container hopper 135 may include a load balancer (not shown) that orchestrates the movement and interaction of the containers in the container layer 140.

The final layer shown in FIG. 1 is a container layer 140, a virtual software layer that may comprise one or more containers that share the host OS kernel. Each container includes the binaries and libraries required for that container. For purposes of illustration, the container layer 140 of FIG. 1 comprises a first virtual container 150a (labeled in FIG. 1 as "Container A1") that is associated with one or more software processes "A" that may be run in the virtual environment. While the present disclosure generally describes the first virtual container 150a as associated with one or more "software processes" that may be "run" in the virtual environment, it is to be understood that the terms "software processes" and "run" are meant to be construed in their broadest sense, i.e., the first virtual container 150a may comprise any type of virtual container running, executing, performing or processing one or more software processes, instructions, workloads, or commands. By way of example, the first virtual container 150a may comprise an application container, i.e., with the first virtual container 150a housing one or more applications associated with one or more workloads that may be run on the virtual platform. Moreover, the first virtual container 150a may be associated with any number of software processes, but for purposes of illustration and simplicity, the present disclosure will hereafter refer to the one or more software processes associated with the first virtual container 150a in the singular (as a "software process", namely "software process A").

The container layer 140 further comprises Containers A2-An, which are replicas or duplicates 150b-n of the first virtual container 150a (Container A1). Together, the first virtual container 150a and its duplicates 150b-n, i.e., Containers A1-An, are referred to as a plurality of replicated virtual containers 150, with each being an exact duplicate of the others and each associated with the software process A of the first virtual container 150a. As shown in FIG. 1, the designation "n" in "Container An 150n" indicates that the plurality of replicated virtual containers 150 may comprise any number (n) of replicated virtual containers. Thus, the first virtual container 150a may be replicated any number of times to yield the plurality of replicated virtual containers 150.

In an embodiment, system 100 may be configured to secure any number of containers, each container associated with a software process, and each container having its own associated plurality of replicated virtual containers. In other words, system 100 may include multiple pluralities of replicated virtual containers. For example, in addition to the plurality of replicated virtual containers that are shown in FIG. 1 (i.e., Containers A1-An 150a-n associated with software process A, wherein Containers A2-An 150b-n are duplicates of Container A1 150a), system 100 may further include one or more additional pluralities of replicated virtual containers (not shown), e.g., Container B1-Bn associated with a software process B wherein Containers B2-Bn are duplicates of Container B1, Containers C1-Cn associated with a software process C wherein Containers C2-Cn are duplicates of Container C1, Containers D1-Dn associated with a software process D wherein Containers D2-Dn are duplicates of Container D1, and so on. The multiple pluralities of replicated virtual containers may operate in parallel with one another. A load balancer may be used within or in association with the container engine 130 and/or the container hopper 135 to manage the multiple pluralities of replicated virtual containers and their associated software processes.

It is to be understood that the architecture of system 100, including its layers and their corresponding functionality, may be modified or adapted, as understood by one of ordinary skill in the art. For example, while the container engine 130 is described as a singular virtualization layer having multiple functionalities, it may be built in multiple layers and/or with multiple modules. Layers, features, elements, modules, and/or components may be combined, merged, communicably connected, divided, separated, and/or otherwise arranged in any form or manner without departing from the scope of the present disclosure.

In operation, the container engine 130, or more specifically, the container hopper 135 of the container engine 130, may select a virtual container (e.g., the first virtual container 150a in FIG. 1) for container security via the hopping mechanism of the present disclosure. The container hopper 135 may "select" the first virtual container 150a in response to an input or instruction received from a user, through a programmed configuration, through an administrative configuration, or some other means known in the art. The input, instruction, or configuration may identify the first virtual container 150a and/or its associated software process to be selected for container security. In an embodiment, a virtual container need not be specifically or individually "identified" (by input, instruction, or otherwise) to be selected for container security. For example, the container hopping mechanism of the present disclosure may be configured for application on all containers associated with a particular system, server, user, etc. Additionally, it is to be understood that the term "select" broadly refers to the concept of choosing a virtual container for the purpose of doing something with it, e.g., here, to apply the container hopping mechanism.

Next, the container engine 130, or more specifically, the container hopper 135 of the container engine 130 may replicate (or initiate the replication of) the selected first virtual container 150a to create a plurality of replicated virtual containers 150. As described above, the plurality of replicated virtual containers may comprise any number of replicated virtual containers. In an embodiment, the container hopper 135 may use a replicator module that is housed within the container engine 130, within the container hopper 135 itself, or within one of the layers of system 100 to carry out the replication of the first virtual container 150a. As described above, each of the plurality of replicated virtual containers 150 is an exact replica or duplicate of the first virtual container 150a. Thus, each of the plurality of replicated virtual containers 150 is associated with, or contains, the same software process (here, software process A) as the first virtual container 150a. In an embodiment, the plurality of replicated virtual containers 150 includes the first virtual container 150a and its duplicates 150b-n.

Additionally, the plurality of replicated virtual containers 150 are configured to run in parallel and synchronously. Thus, by way of example, if the first virtual container 150a is an application container having an associated workload, each of the plurality of replicated virtual containers 150a-n would be duplicates of the application container and the workloads of each of the plurality of replicated virtual containers 150 would run in a synchronous manner.

Next, the container hopper 135 may generate a randomized hopping set that defines a set (i.e., defined as one or more) of replicated virtual containers of the plurality of replicated virtual containers 150. The term "generate" may be broadly construed and may refer to an action taken by the container hopper 135 in response to one or more configurations, instructions, inputs or commands received by the container hopper 135 or the container engine 130. For example, an administrator may input information or instructions (which is/are received by the container hopper 135 or the container engine 130) that direct the container hopper 135 itself to generate (i.e., create) the randomized hopping set. In another example, the randomized hopping set may be input by an administrator and then "generated" (i.e., initiated or effected) by the container hopper 135. In yet another example, the randomized hopping set may be auto-generated by the container engine 130, the container hopper 135, or another component of system 100 (e.g., a random number generator) based on system configurations. The randomized hopping set establishes a pseudo-random sequence of the set of replicated virtual containers, the sequence defining the order in which to run the software process. In other words, the hopping set may define certain replicated virtual containers (e.g., one, some, or all of the plurality of replicated containers) from the plurality of replicated virtual containers 150 and order them in a randomized sequence, so that the software process may be run sequentially from the defined set of replicated virtual containers based on the sequence. By way of example, assume that a hopping set (Set 1) comprises containers in the following sequence: {(Set 1): A2; A5; A1}, wherein A2, A5, and A1 correspond to Container A2 150b, Container A5 150e, and Container A1 150a, respectively. Thus, the software process will be sequentially run, starting from Container A2 150b, then handed to Container A5 150e, and then to Container A1 150a, constantly moving or "hopping" from one replicated virtual container to the next replicated virtual container and so on, in accordance with the sequence set forth in the hopping set. This hopping mechanism and process may be referred to as "container hopping."

The present disclosure describes the software process as being sequentially run "from" a defined set of replicated virtual containers. It is to be understood that the term "from" is to be broadly construed; in other words, the present disclosure contemplates that the running of a software process "from" a given replicated virtual container may include the software process running within the replicated virtual container, outside the replicated virtual container (e.g., such as from a container wrapper that is associated with and that may be physically outside the replicated virtual container), and/or in conjunction with a replicated virtual container.

In an embodiment, the randomized hopping set may be associated with a time setting. The time setting, as further described below, may indicate the one or more lengths of time the software process will run from each container of the set of replicated virtual containers defined in the hopping set. In another embodiment, the randomized hopping set may further be associated with a port setting. The port setting, also further described below, may indicate one or more ports from which each container of the set of replicated virtual containers will run the software process. In yet another embodiment, the randomized hopping set may be associated with a combination of both a time setting and a port setting. The time setting and/or the port setting may be configured by an administrator, or may be auto-generated by the container engine 130, the container hopper 135, or another component of system 100.

The hopping set works like a key that is known only to the user of the container (or the user's device) and the container hopper 135. Therefore, when the user of a container connects to the container hopper 135 with his/her device, the key held only by the user device and the container hopper 135 will allow the software process to be executed across the defined replicated virtual containers in accordance with the hopping set. When combined with a time setting and/or a port setting, the hopping set increases container security and severely inhibits the ability of an unauthorized user to gain access into the process running in the hopping containers.

Figure 2:
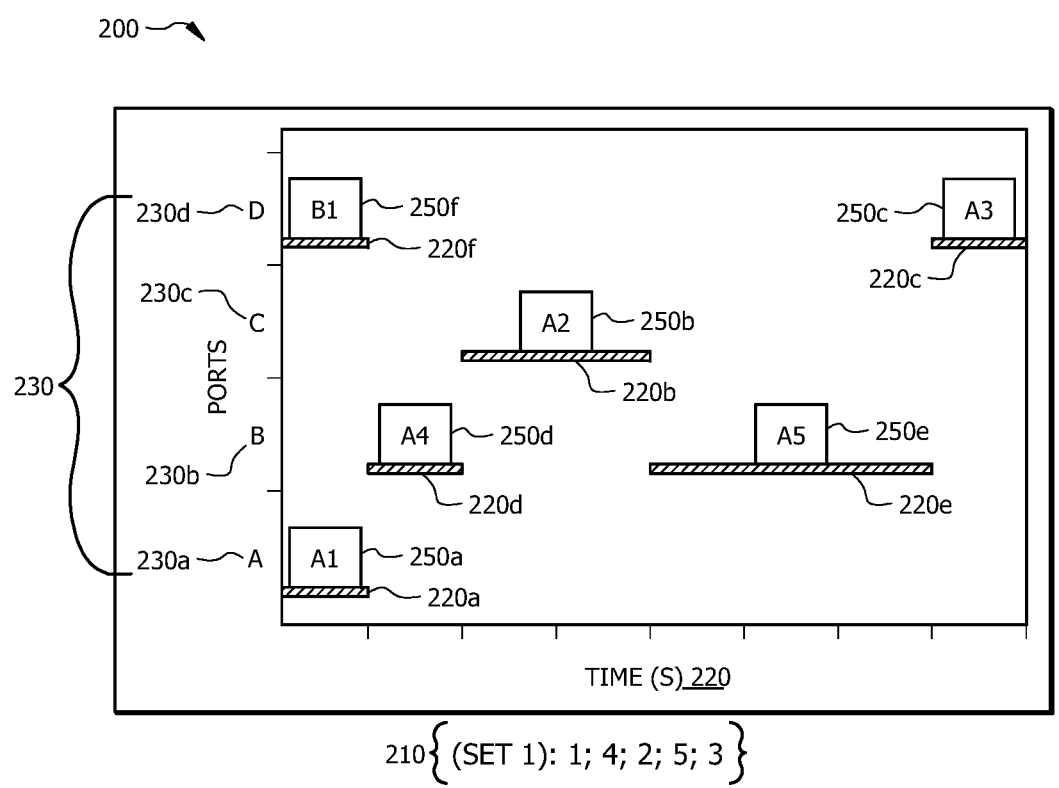
FIG. 2 illustrates a hopping mechanism for container security based on a time setting and a port setting, in accordance with certain embodiments.

To further illustrate the mechanism of container hopping of system 100, reference is now made to FIG. 2, wherein is shown a graph 200 depicting container hopping in conjunction with a plurality of replicated virtual containers, Containers A1-A5 250a-e, respectively. Containers A1-A5 250a-e are identical containers that are all active and running synchronously. Containers A1-A5 250a-e are also associated with a particular software process "A" (or a particular set of software processes "A"). For purposes of illustration and simplicity, the present disclosure will refer to the "software process" in the singular, but it is to be understood that Containers A1-A5 250a-e may be associated with one or more software processes.

FIG. 2 further shows a sample hopping set 210 that establishes the sequence for running the software process associated with a plurality of replicated virtual containers 250a-e. In particular, the sample hopping set 210 defines a set of replicated virtual containers comprising the following: "{(Set 1): 1; 4; 2; 5; 3}." Each numeral of the hopping set corresponds to a replicated virtual container of the plurality of replicated virtual containers, i.e., with numeral 1 corresponding to Container A1 250a, numeral 4 corresponding to Container A4 250d, numeral 2 corresponding to Container A2 250b, and so on. Although Set 1 of FIG. 2 includes each of the plurality of replicated virtual containers 250a-e associated with software process A, it is to be understood that the defined set of virtual replicated containers of the hopping set 210 need not reference each of the plurality of replicated virtual containers 250a-e. For example, an alternate hopping set may comprise the following: {(Set 2): 4; 3; 5}, wherein a set comprising less than the plurality of replicated virtual containers (Containers A4 250d, A3 250c, and A5 250e) forms the sequence of the hopping set. Likewise, the hopping set may repeat one or more of the plurality of replicated virtual containers as follows: {(Set 3): 5; 2; 5; 3; 5; 1; 4}, wherein Container A5 250e is repeated three times. In other words, the sequence of the hopping set 210 may be any length and may be based on any combination of one or more of the plurality of replicated virtual containers.

The randomized hopping set may further be associated with a time setting 220 and/or a port setting 230, as shown on the x- and y-axes of graph 200. The time setting 220 may indicate the predetermined length(s) of time the software process will run from each container of the set of replicated virtual containers 250a-e defined by the hopping set. The predetermined lengths of time associated with the plurality of replicated virtual containers may be the same, or may differ for each replicated virtual container. The time setting 220 may be based on seconds (s) or any other measurable unit of time. The port setting 230 may indicate the port(s) from which each of the replicated virtual containers 250a-e will run. In FIG. 2, the port setting 230 includes four ports, labeled in the graph 200 as Ports A 230a, B 230b, C 230c, and D 230d. FIG. 2 illustrates the mechanism of container hopping based on a hopping set 210 associated with a time setting, as well as a port setting. But it is to be understood that the hopping set of the present disclosure need not be limited to any particular setting(s). In other words, the hopping set 210 may be based on a time setting, a port setting, or a combination of time and port settings. The present disclosure contemplates that the hopping set 210 may also be based on a combination of any other settings not specifically set forth above, e.g., hosts, spaces, systems, etc., as known or discovered in the art.

With continued reference to FIG. 2, the container hopping mechanism of the present disclosure will first be described in conjunction with the hopping set 210 associated with a time setting 220 indicating the pre-determined lengths of time the software process will run from each container. In particular, in accordance with the hopping set 210, the software process associated with the plurality of replicated virtual containers 250a-e will begin running from Container A1 250a for a first predetermined length of time 220a (e.g., corresponding to 1 second), then will be handed off to run from Container A4 250d for a predetermined length of time 220d (e.g., corresponding to 1 second), then will be handed off to run from Container A2 250b for a predetermined length of time 220b (e.g., corresponding to 2 seconds), then to run from Container A5 250e for a predetermined length of time 220e (e.g., corresponding to 3 seconds), and then finally to run from Container A3 250c for a predetermined length of time 220c (e.g., corresponding to 1 second). The time setting may be based on any measurable unit of time, and the predetermined lengths of time may be the same in each container or may vary from container to container.

The container hopping mechanism of the present disclosure may further be configured such that the hopping set 210 is associated with a port setting 230. The port setting may be a standalone setting or may be used in conjunction with the time setting 220 for additional container security. Each time the software process is handed off to the next replicated virtual container, it may be handed off from different virtualized ports. By way of example, in FIG. 2, the software process may be run from Container A1 250a running from Port A 230a for a predetermined period of time 220a, and then handed off to Container A4 250d that may be run from Port B 230b, then handed off to Container A2 250b that may run from Port C 230c, then handed off to Container A5 250e that may run from Port B 230b, and then handed off to Container A3 250c that may run from Port D 230d. The combination of the time setting 220 and the port setting 230 increases the difficulty of malicious attacks on the container by an unauthorized user. Even if a particular replicated virtual container was successfully hacked, the unauthorized attacker would only be "own" the container for a brief period of time, as the software process has been handed off to the next replicated virtual container in the sequence of the hopping set 210.

In an embodiment, once the sequence set forth in the hopping set 210 is complete, the sequence may repeat. In another embodiment, the randomized hopping set 210 may be updated by the container hopper with an updated set of replicated virtual containers from the plurality of virtual containers, the updated randomized hopping set establishing a new/updated sequence for running the software process. The updated randomized hopping set may further include a new time setting and/or port setting. In an embodiment, the randomized hopping set may be updated after a configured period of time (e.g., after 1 minute, 1 hour, 24 hours, 48 hours, etc.). In another embodiment, the hopping set may be updated based on the life cycle of the software process (e.g., updated with a new sequence upon achieving or completing certain defined thresholds).

FIG. 2 further shows a virtual container B1 250*f*, associated with a software process B, that is running in parallel with the plurality of replicated virtual containers A1-A5 250*a-e* for a predetermined period of time 220*f*. As described above in conjunction with FIG. 1, the container security mechanism of the present disclosure may be configured such that multiple pluralities of replicated virtual containers may run in parallel. Thus, in addition to the plurality of replicated virtual containers represented by Containers A1-A5 250*a-e*, Container B1 250*f* and its duplicates (not shown) may operate in parallel. In an embodiment, Container B1 250*f* and its duplicates may run in parallel with Container A1-A5 250*a-e* on different ports, such that no two given virtual containers are running from the same port at the same given time (e.g., Container A1 250*a* may run from Port A 230*a* at the same time that Container B1 250*f* runs from Port D 230*d*). In another embodiment, Container B1 250*f* and its duplicates may run in parallel with Containers A1-A5 250*a-e* and may overlap in port usage to some degree (and to the extent possible), such that two or more given virtual containers may run from the same port at the same given time.

Returning to FIG. 1, the container engine 130 and/or the container hopper 135 of system 100 may be operable to update the plurality of replicated virtual containers 150. For example, the container engine 130 and/or the container hopper 135 may carry out a "destroy" function 160, wherein one or more replicated virtual containers (e.g., Container A10 150*j* in FIG. 1) of the plurality of replicated virtual containers 150 may be destroyed or deleted after a predetermined period of time or after achieving or completing one or more defined thresholds. Likewise, the container engine 130 and/or the container hopper 135 may include or invoke a replicator operable to carry out a "create" function 170, wherein one or more new replicated virtual containers (e.g., New Container A10 150*k* in FIG. 1) may be created. In an embodiment, a newly replicated virtual container (e.g., New Container A10 150*k*) may be created to replace a deleted container. For example, if Container A10 150*j* is deleted, New Container A10 150*k* may replace Container A10 150*j*, i.e., by directly taking the place of the deleted container. In another example, the deletion of a replicated virtual container may prompt the plurality of containers to shift positions, and the newly-created replicated virtual container (e.g., New Container A10 150*k*) may take the last open position. For example, if Container A7 150*g* is deleted, Containers A8-An 150*h-n* may shift left to take new positions as Containers A7-An-1. Then, the newly-created replicated virtual container may take the last open position, e.g., in this case, the position that is left open after Container An shifts left. The create and destroy functions of the container engine 130 add further security to the container hopping mechanism, so that even if a particular replicated virtual container was successfully hacked, the container may be subject to destruction after a predetermined period of time, thereby thwarting any significant efforts by a unauthorized user to gain access. It is to be understood that although the create function 160 and the destroy function 170 are shown outside the layers of the system 100 in FIG. 1, both the create function 160 and the destroy function 170 may be features of the container engine 130 and/or the container hopper 135.

The system 100 of FIG. 1 may also provide for multi-tenancy, i.e., to support a plurality of tenants, wherein a respective randomized hopping set is generated for each tenant of the plurality of tenants so that multiple tenants and/or multiple devices may access the plurality of replicated virtual containers 150. In an embodiment, if a first tenant or first device runs the software process A of the first virtual container 150*a* across a set of replicated virtual containers in accordance with a sequence established in a hopping set, a second tenant or second device may run the same software process on the same set of replicated virtual containers of the plurality of replicated virtual containers by using a second hopping set having a different sequence. The sequence of the second hopping set may be configured so that there is no overlap in the use of a particular replicated virtual container by the first and second tenants (or the first and second devices) at a given time. In other words, multiple tenants may run the same software process (or even different software processes) using the same plurality of replicated virtual containers, and even the same set of replicated virtual containers from the plurality of virtual containers, so long as no two tenants are simultaneously using a given replicated virtual container at the same given time. In another embodiment, the second hopping set may comprise a different set of replicated virtual containers. For example, instead of the plurality of replicated containers comprising ten duplicates (as shown in FIG. 1), assume there were one hundred duplicates. A second hopping set may be based on any of the duplicates not being used by the first hopping set.

Figure 3:
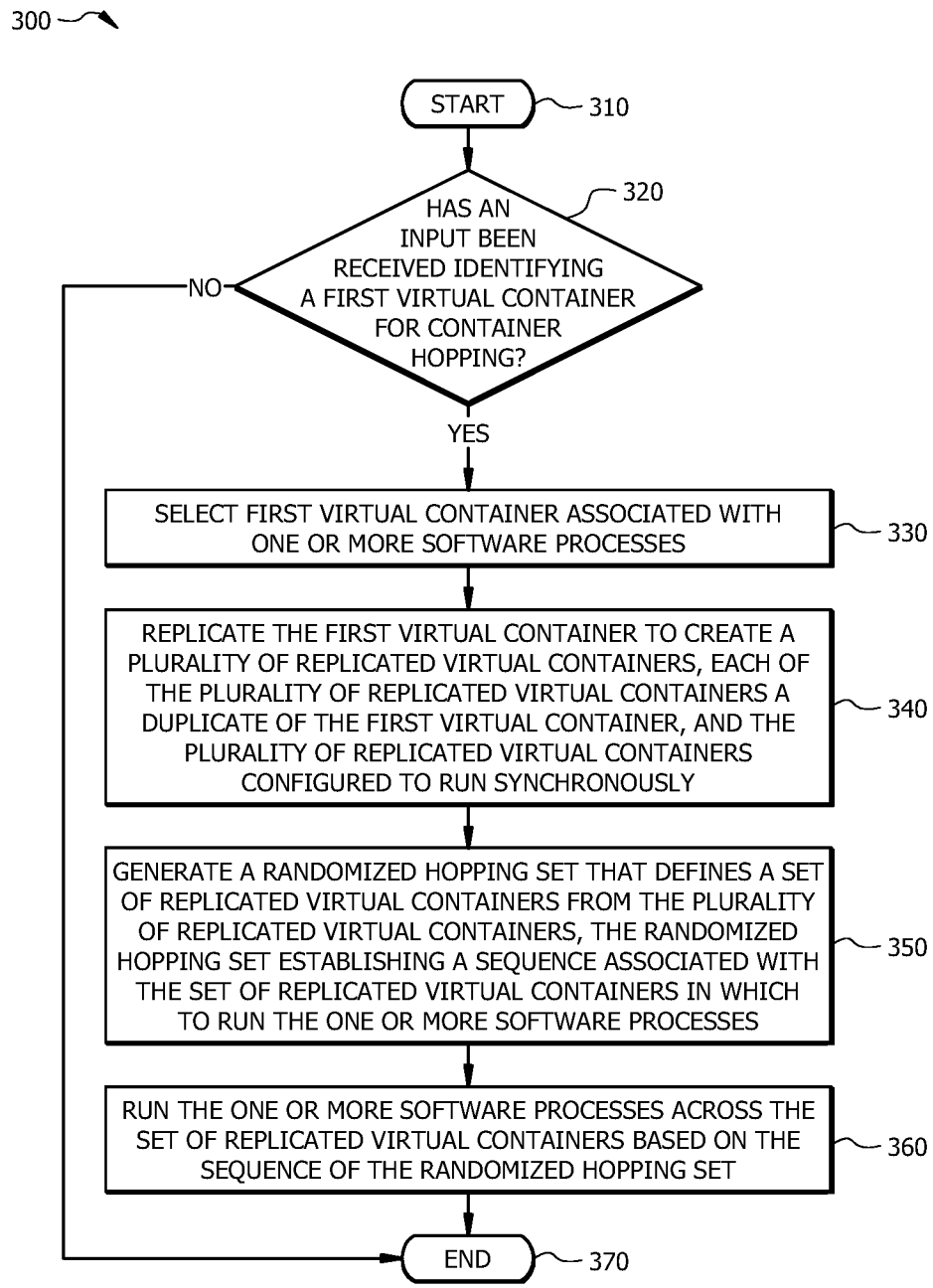
FIG. 3 illustrates a flow diagram of a method for container security using a hopping mechanism, in accordance with certain embodiments.

Reference is now made to FIG. 3, which depicts a flow diagram of a method 300 for container security using a hopping mechanism. The steps of method 300 may be in accord with the operations outlined in conjunction with the system 100 of FIG. 1 and the graph 200 of FIG. 2. As such, similar and corresponding terms described in conjunction with FIGS. 1 and 2 may have the same meaning when used in conjunction with method 300 of FIG. 3. Additionally, the present disclosure incorporates by reference the descriptions of FIGS. 1 and 2 for the purposes of explaining, expounding upon, or otherwise clarifying the steps of method 300.

Method 300 may be performed in a virtual environment configured to create and manage virtual containers. The virtual environment may be formed and deployed based on a series of architectural layers, as described in conjunction with FIG. 1. In addition to an infrastructure layer (i.e., the physical hardware used for deployment) and the host OS layer (including the host OS kernel that be shared by the containers), the architecture may include a virtualization layer comprising a container engine. The container engine may deploy containers and may include functionality for allocating cores and memory to containers, enforcing spatial isolation and security, and providing load balancing and scalability by enabling the addition and removal of containers. In accordance with the present disclosure, the container engine may also include a container hopper, a module or set of modules residing in the container engine which may perform and carry out the operations of the container hopping mechanism of the present disclosure. In an embodiment, the container hopper may include a load balancer that orchestrates the movement and interaction of the containers in the container layer.

Finally, sitting on top of the virtualized container engine is a container layer, a virtual software layer comprising one or more containers that share the host OS kernel, wherein each container includes the binaries and libraries required for that container.

In an embodiment, the steps of method 300 may be performed from the perspective of the container engine, and more specifically, the container hopper. However, it is to be understood that method 300 may be performed by any component, element, or module associated with virtualized environment without departing from the spirit or scope of the present disclosure. For purposes of illustrating method 300, the container layer may comprise at least one virtual container (hereinafter referred to as the "first virtual container") that is associated with one or more software processes that may be run in the virtual environment. While the present disclosure is described in conjunction with the first virtual container, it is to be understood that the mechanisms disclosed herein may be applied, without limitation, to any number of virtual containers. Additionally, although the first virtual container is generally described as associated with one or more "software processes" that may be "run" in the virtual environment, it is to be understood that the terms "software processes" and "run" are meant to be construed in their broadest sense, i.e., the first virtual container may comprise any type of virtual container running, executing, performing or processing one or more software processes, instructions, workloads, or commands. Moreover, the first virtual container may be associated with any number of software processes, but for purposes of illustration and simplicity, the present disclosure will hereafter refer to the one or more software processes associated with the first virtual container in the singular (as a "software process").

The method 300 may begin at step 310. At step 320, the container hopper may make a determination as to whether an input or instruction has been received identifying a virtual container (e.g., the first virtual container) or its associated software process to be selected for container security via the hopping mechanism of the present disclosure. The input or instruction may be received by the container hopper from a user, through a programmed configuration, through an administrative configuration, or some other means known in the art. If, at step 320, an input has not been received identifying a first virtual container to be selected for container security, the method may end at step 370. If, however, at step 320, an input has been received identifying a first virtual container to be selected for container security, the method may proceed to step 330. In an embodiment, a virtual container need not be specifically "identified" (by input, instruction, or otherwise) to be selected for container security. For example, the container hopping mechanism of the present disclosure may be configured for application on all containers associated with a particular system, server, user, etc.

At step 330, the container hopper may select the first virtual container for container hopping. The container hopper 135 may "select" the first virtual container in response to the input or instruction received in step 320. The term "select" broadly refers to the concept of choosing a virtual container for the purpose of doing something with it, e.g., here, to apply the container hopping mechanism. The first virtual container may be associated with one or more software processes.

At step 340, the container hopper may replicate, or initiate the replication of, the first virtual container to create a plurality of replicated virtual containers. In an embodiment, the container hopper may use a replicator module that is housed within the container engine, within the container hopper itself, or within one of the layers of system to replicate the first virtual container. Each of the plurality of replicated virtual containers is a duplicate or exact replica of the first virtual container. Thus, each of the plurality of replicated containers is associated with the same one or more software processes as the first virtual container. In an embodiment, the plurality of replicated virtual containers includes the first virtual container and its replicas. Each of the plurality of replicated virtual containers is configured to be active and to run synchronously.

At step 350, the container hopper may generate a randomized hopping set that defines a set (e.g., comprising one or more) of the replicated virtual containers from the plurality of replicated virtual containers. The term "generate" may be broadly construed and may refer to an action taken by the container hopper in response to one or more configurations, instructions, inputs or commands received by the container hopper or the container engine. For example, the randomized hopping set may be input by an administrator and then "generated" (i.e., initiated or effected) by the container hopper. In another example, an administrator may input information or instructions that allow the container hopper itself to generate (i.e., create) the randomized hopping set. In yet another example, the randomized hopping set may be auto-generated by the container engine, the container hopper, or another component of the virtualized or non-virtualized layer(s). The randomized hopping set establishes a pseudo-random sequence of the set of replicated virtual containers, the sequence defining the order in which to run the one or more software processes. In the other words, the one or more software processes associated with the selected first virtual container may be run sequentially from the set of replicated virtual containers based on the sequence of the randomized hopping set. At step 360, the container engine or the container hopper may run the one or more software processes across the set of replicated virtual containers based on the sequence of the randomized hopping set.

To further illustrate steps 350 and 360, assume the first virtual container has been replicated four times, resulting in a plurality of (five) replicated virtual containers, Containers A1, A2, A3, A4, and A5. Assume a sample hopping set defines a set of replicated containers comprising three replicated containers from the plurality of replicated containers, Containers A1, A2, and A3, and establishes the following sequence: {(Set 1): A2; A1; A3}, with A2, A1, and A3 corresponding to Container A2, Container A1, and Container A3, respectively. In accordance with the sequence set forth in the hopping set, the one or more software processes will be run sequentially starting from Container A2, then from Container A1, and then from Container A3, constantly moving or "hopping" from one replicated virtual container to the next replicated virtual container and so on. This process may be referred to as "container hopping."

The present disclosure describes the software process as being sequentially run "from" a defined set of replicated virtual containers. It is to be understood that the term "from" is to be broadly construed; in other words, the present disclosure contemplates that the running of a software process "from" a given replicated virtual container may include the software process running within the replicated virtual container, outside the replicated virtual container (e.g., such as from a container wrapper that is associated with and that may be physically outside the replicated virtual container), and/or in conjunction with a replicated virtual container.

In an embodiment, the randomized hopping set may be associated with a time setting. The time setting may indicate the pre-determined lengths of time the one or more software processes will run from each container of the set replicated virtual containers defined by the hopping set. With reference to the sample hopping set above, a sample time setting may indicate that the one or more software processes will be run sequentially starting from Container A2 for 1 second, then from Container A1 for 3 seconds, and then from Container A3 for 2 seconds. The time setting may be based on any measurable unit of time, and the predetermined lengths of time may be the same in each container or may vary from container to container.

In another embodiment, the randomized hopping set may further be associated with a port setting. The port setting may indicate one or more ports from which each container of the set of replicated virtual containers will run the one or more software processes. With continued reference to the hopping set above, a sample port setting may indicate that Container A2 will be run from a first port, Container A1 will be run from a second port, and Container A3 will be run from a third port. The port setting may be a standalone setting or may be used in conjunction with the time setting for additional container security. In other words, the randomized hopping set may be based on a time setting, on a port setting, or a combination of time and port settings. The present disclosure contemplates that the randomized hopping set may also be based on a combination of any other settings not specifically set forth above, e.g., hosts, spaces, systems, etc., as known or discovered in the art.

The hopping set works like a key that is known only to the user of the container (or the user's device) and the container hopper. Therefore, when the user of a container connects to the container hopper with his/her device, the key held only by the user device and the container hopper will allow the one or more software processes of the container to be executed across the defined replicated virtual containers in accordance with the hopping set. When combined with a time setting and/or a port setting, the container hopping mechanism increases security and limits the ability of an unauthorized user to hack or access a container and/or the one or more software processes running therein, including its related information, code, and other data. Even if a particular replicated virtual container was successfully hacked, the unauthorized attacker would only be "own" the container for a brief period of time, as the software process has been handed off to the next replicated virtual container in the sequence of the hopping set. At step 370, the method may end.

In an embodiment, the container engine and/or the container hopper may be operable to update the randomized hopping set with an updated set of replicated virtual containers from the plurality of virtual containers. The updated randomized hopping set may establish a new/updated sequence for running the software process. The updated randomized hopping set may further include a new time setting and/or port setting. In an embodiment, the randomized hopping set may be updated after a configured period of time (e.g., after 1 minute, 1 hour, 24 hours, 48 hours, etc.). In another embodiment, the hopping set may be updated based on the life cycle of the software process (e.g., updated with a new sequence upon achieving or completing certain defined thresholds).

In an embodiment, the container engine and/or the container hopper may be operable to carry out a "destroy" function, wherein one or more replicated virtual containers of the plurality of replicated virtual containers may be destroyed or deleted after a predetermined period of time. Likewise, the container engine and/or the container hopper may include or invoke a replicator that may be operable to carry out a "create" function, wherein one or more new replicated virtual containers may be created. In an embodiment, a new replicated virtual container may be created to replace a deleted container. For example, the new replicated virtual container may replace, i.e., by directly taking the place of, the deleted container. In another example, the deletion of a replicated virtual container may prompt the plurality of containers to shift positions, and the newly-created replicated virtual container may take the last open position. The create and destroy features of the container engine may add further security to the container hopping mechanism, so that even if a particular replicated virtual container was successfully hacked, the container may be subject to destruction after a predetermined period of time, thereby thwarting any significant efforts by a unauthorized user to gain access.

Method 300 may also allow for multitenancy, i.e., to support a plurality of tenants, wherein a respective randomized hopping set is generated for each tenant of the plurality of tenants so that multiple tenants and/or multiple devices may access the plurality of replicated virtual containers. In an embodiment, if a first tenant or first device runs the one or more software processes of the first virtual container across a set of replicated virtual containers in accordance with a sequence established in a hopping set (the set of replicated virtual containers from the plurality of replicated virtual containers), a second tenant or second device may run the same software process on the same set of replicated virtual containers of the plurality of replicated virtual containers by using a second hopping set having a different sequence. The sequence of the second hopping set may be configured so that there is no overlap in the use of a particular replicated virtual container by the first and second tenants (or the first and second devices) at the same given time. In other words, multiple tenants may run the same software process (or even different software processes) using the same plurality of replicated virtual containers, and even the same set of replicated virtual containers from the plurality of virtual containers, so long as no two tenants are simultaneously using a given replicated virtual container at the same given time. In another embodiment, the second hopping set may comprise a different set of replicated virtual containers that are not used by the first hopping set.

In yet another embodiment, method 300 may allow for container security for any number of containers, each container associated with one or more software processes, and each container having its associated plurality of replicated virtual containers. In other words, method 300 may allow for multiple pluralities of replicated virtual containers. The multiple pluralities of replicated virtual containers may operate in parallel with one another. A load balancer may be used within or in associated with the container engine and/or the container hopper to manage the plurality of replicated virtual containers and their associated software processes.

In sum, the systems and methods of the present disclosure may allow for container security by providing for a container hopping mechanism, as described above. Taking advantage of the virtual and temporary nature of containers, the mechanism of the present disclosure makes it difficult to hack a containerized environment by moving processes across multiple containers in a time-based and/or port-based sequence. The result provides a way to create a trusted cloud environment and provide end to end security in a cloud-native context.

Figure 4:
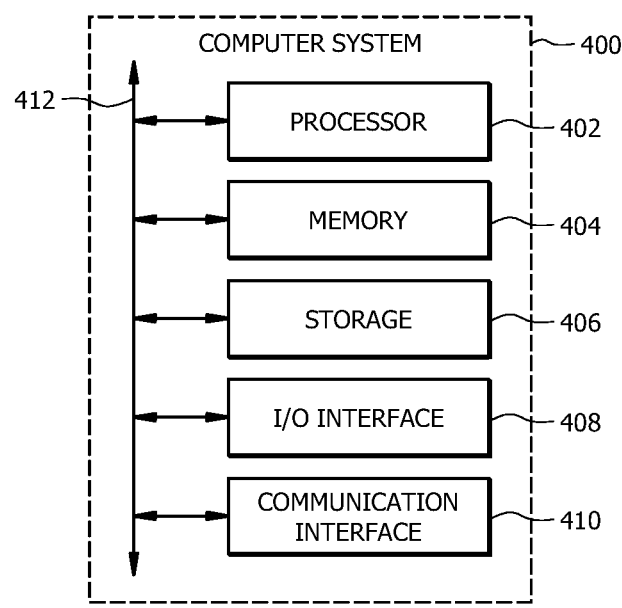
FIG. 4 illustrates a computer system, in accordance with certain embodiments.

Reference is now made to FIG. 4, wherein is shown an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system comprising:
one or more processors; and
one or more computer-readable non-transitory storage media comprising instructions that, when executed by the one or more processors, cause one or more components of the system to perform operations comprising:
selecting a first virtual container associated with one or more software processes;
replicating the first virtual container to create a plurality of replicated virtual containers, each of the plurality of replicated virtual containers is a duplicate of the first virtual container, and the plurality of replicated virtual containers configured to run synchronously;
generating a randomized hopping set that defines a set of replicated virtual containers from the plurality of replicated virtual containers, the randomized hopping set establishing a sequence of the set of replicated virtual containers in which to run the one or more software processes; and
running the one or more software processes across the set of replicated virtual containers based on the sequence of the randomized hopping set, wherein the one or software processes run on each of the replicated virtual containers for a predetermined time period, wherein running further comprises updating the plurality of replicated virtual containers, wherein the updating comprises:
deleting a replicated virtual container of the plurality of replicated virtual containers;
in response to deleting the replicated virtual container, creating an open position in the randomized hopping set by shifting each remaining replicated virtual container of the plurality of virtual containers in the randomized hopping set by one position in the sequence;
creating a new replicated virtual container;
replacing the deleted replicated virtual container with the new replicated virtual container in the randomized hopping set by assigning the new replicated virtual container to the open position in the randomized hopping set, thereby creating an updated randomized hopping set and establishing an updated sequence of the updated set of replicated virtual containers in which to run the one or more software processes; and
running the one or more software processes across the updated set of replicated virtual containers based on the updated sequence of the updated randomized hopping set.

2. The system of claim 1, wherein the randomized hopping set is further associated with a time setting, the time setting indicating one or more lengths of time the one or more software processes will run from each replicated virtual container of the set of replicated virtual containers.

3. The system of claim 1, wherein the randomized hopping set is further associated with a port setting, the port setting indicating one or more ports from which each replicated virtual container of the set of replicated virtual containers will run the one or more software processes.

4. The system of claim 1, wherein the plurality of replicated virtual containers is configured to support a plurality of tenants, wherein a respective randomized hopping set is generated for each tenant of the plurality of tenants.

5. A method, comprising:
selecting a first virtual container associated with one or more software processes;
replicating the first virtual container to create a plurality of replicated virtual containers, each of the plurality of replicated virtual containers is a duplicate of the first virtual container, and the plurality of replicated virtual containers configured to run synchronously;
generating a randomized hopping set that defines a set of replicated virtual containers from the plurality of replicated virtual containers, the randomized hopping set establishing a sequence of the set of replicated virtual containers in which to run the one or more software processes; and
running the one or more software processes across the set of replicated virtual containers based on the sequence of the randomized hopping set, wherein the one or software processes run on each of the replicated virtual containers for a predetermined time period, wherein running further comprises updating the plurality of replicated virtual containers, wherein the updating comprises:
deleting a replicated virtual container of the plurality of replicated virtual containers;
in response to deleting the replicated virtual container, creating an open position in the randomized hopping set by shifting each remaining replicated virtual container of the plurality of virtual containers in the randomized hopping set by one position in the sequence;
creating a new replicated virtual container;
replacing the deleted replicated virtual container with the new replicated virtual container in the randomized hopping set by assigning the new replicated virtual container to the open position in the randomized hopping set, thereby creating an updated randomized hopping set and establishing an updated sequence of the updated set of replicated virtual containers in which to run the one or more software processes; and
running the one or more software processes across the updated set of replicated virtual containers based on the updated sequence of the updated randomized hopping set.

6. The method of claim 5, wherein the randomized hopping set is further associated with a time setting, the time setting indicating one or more lengths of time the one or more software processes will run from each replicated virtual container of the set of replicated virtual containers.

7. The method of claim 5, wherein the randomized hopping set is further associated with a port setting, the port setting indicating one or more ports from which each replicated virtual container of the set of replicated virtual containers will run the one or more software processes.

8. The method of claim 5, wherein the plurality of replicated virtual containers is configured to support a plurality of tenants, wherein a respective randomized hopping set is generated for each tenant of the plurality of tenants.

9. One or more computer-readable non-transitory storage media embodying instructions that, when executed by a processor, cause performance of operations comprising:

selecting a first virtual container associated with one or more software processes;

replicating the first virtual container to create a plurality of replicated virtual containers, each of the plurality of replicated virtual containers is a duplicate of the first virtual container, and the plurality of replicated virtual containers configured to run synchronously;

generating a randomized hopping set that defines a set of replicated virtual containers from the plurality of replicated virtual containers, the randomized hopping set establishing a sequence of the set of replicated virtual containers in which to run the one or more software processes; and running the one or more software processes across the set of replicated virtual containers based on the sequence of the randomized hopping set, wherein the one or software processes run on each of the replicated virtual containers for a predetermined time period, wherein running further comprises updating the plurality of replicated virtual containers, wherein the updating comprises:

deleting a replicated virtual container of the plurality of replicated virtual containers;

in response to deleting the replicated virtual container, creating an open position in the randomized hopping set by shifting each remaining replicated virtual container of the plurality of virtual containers in the randomized hopping set by one position in the sequence;

creating a new replicated virtual container; and replacing the deleted replicated virtual container with the new replicated virtual container in the randomized hopping set by assigning the new replicated virtual container to the open position in the randomized hopping set, thereby creating an updated randomized hopping set and establishing an updated sequence of the updated set of replicated virtual containers in which to run the one or more software processes; and running the one or more software processes across the updated set of replicated virtual containers based on the updated sequence of the updated randomized hopping set.

10. The one or more computer-readable non-transitory storage media of claim 9, wherein the randomized hopping set is further associated with a time setting, the time setting indicating one or more lengths of time the one or more software processes will run from each replicated virtual container of the set of replicated virtual containers.

11. The one or more computer-readable non-transitory storage media of claim 9, wherein the randomized hopping set is further associated with a port setting, the port setting indicating one or more ports from which each replicated virtual container of the set of replicated virtual containers will run the one or more software processes.

12. The one or more computer-readable non-transitory storage media of claim 9, wherein the plurality of replicated virtual containers is configured to support a plurality of tenants, wherein a respective randomized hopping set is generated for each tenant of the plurality of tenants.

* * * * *